United States Patent [19]

Ramsden et al.

[11] 4,412,673

[45] Nov. 1, 1983

[54] BEADED LIQUID APPARATUS AND METHOD

[75] Inventors: Scott C. Ramsden, Houston, Tex.; John C. Braman, San Rafael, Calif.

[73] Assignee: Bechtel International Corporation, San Francisco, Calif.

[21] Appl. No.: 370,029

[22] Filed: Apr. 20, 1982

Related U.S. Application Data

[63] Continuation of Ser. No. 26,617, Apr. 2, 1979, abandoned.

[51] Int. Cl.³ .............................................. B65H 59/00
[52] U.S. Cl. .......................................... 254/134.3 FT
[58] Field of Search ............... 254/134.3 R, 134,3 FT, 254/134.4; 405/171; 175/65; 308/6 R, 6 A; 406/47, 49, 193, 117; 184/15 R; 15/104.3 SN; 198/493, 500

[56] References Cited

U.S. PATENT DOCUMENTS

| 1,943,780 | 1/1934 | Allen | 406/120 |
|---|---|---|---|
| 3,149,885 | 9/1964 | Walsh | 406/193 |
| 3,419,209 | 12/1968 | Munn | 406/117 |
| 3,582,142 | 6/1971 | Titus | 406/47 |
| 3,700,050 | 10/1972 | Miles | 175/65 |
| 3,858,687 | 1/1975 | Masarky et al. | 184/15 R |
| 4,063,603 | 12/1977 | Rayborn | 175/65 |
| 4,106,817 | 8/1978 | Tsuzuku et al. | 406/49 |
| 4,108,279 | 8/1978 | Marcell | 184/15 R |
| 4,200,413 | 4/1980 | Fitch | 406/47 |

FOREIGN PATENT DOCUMENTS 2234482  1/1975  Fed. Rep. of Germany ...... 254/134.3 FT Primary Examiner—Robert C. Watson
Attorney, Agent, or Firm—John L. McGannon

[57] ABSTRACT

Apparatus and method for using a beaded liquid to reduce the coefficient of friction between the inner surface of an elongated support, such as a tubular conduit or pipe, and the outer surface of an inner member, such as a pipe or cable, disposed in and moveable along the support when the latter has horizontal and/or inclined portions. The support contains a flowable liquid which may or may not be provided with beads therein, and the inner member contacts the liquid as the inner member moves along the support. Beads are dispensed into the liquid in the support either in a dry condition or in a mixture with another liquid as the inner member moves along the support.

4 Claims, 7 Drawing Figures

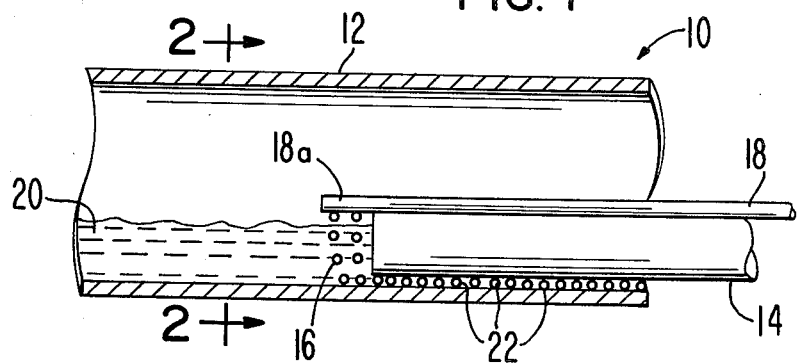
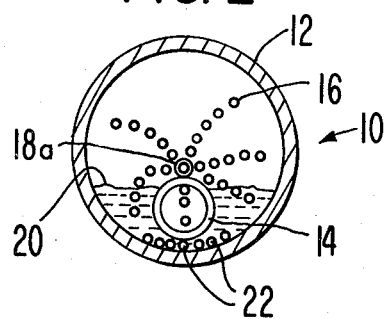
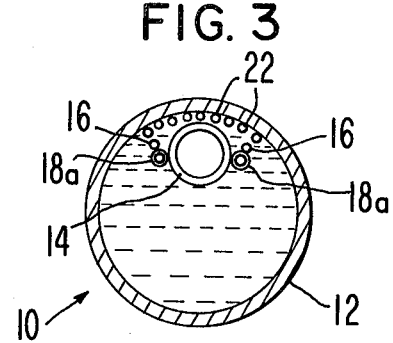
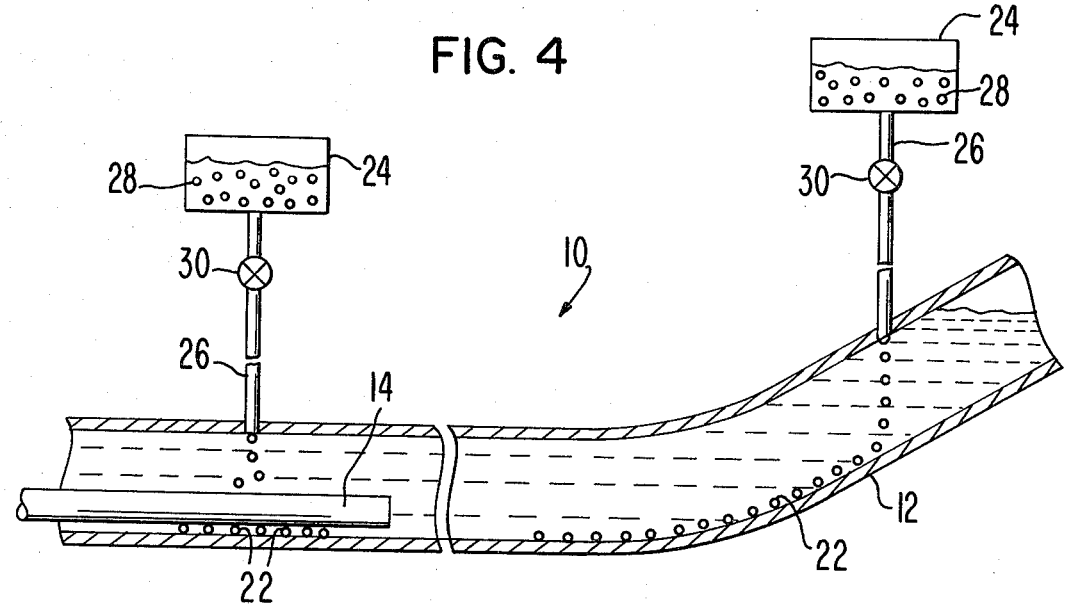

BEADED LIQUID APPARATUS AND METHOD

This is a continuation of application Ser. No. 026,617, filed Apr. 2, 1979, now abandoned.

This invention relates to improvements in the way in which inner members, such as electrical cables or pipes, are moved along an outer support, such as a tubular conduit, which can be above ground, underground or below a body of water. More specifically, the present invention relates to the way in which small, generally spherical beads are dispensed into a liquid carried by an outer support for reducing the friction between the outer support and an inner member moved along the support.

BACKGROUND OF THE INVENTION

The use of a liquid containing small, generally spherical beads therein has been found practical to minimize the effects of friction between an outer, elongated support and an inner member moveable along the support. A beaded liquid is especially useful in cases where cables or pipes are to be moved over long distances through conduits above ground, through underground conduits, or through a passage extending below a body of water. Such a beaded liquid is disclosed in a pending U.S. patent application entitled "Beaded Liquid Product and Method for Reducing Coefficient of Friction", Ser. No. 918,899, filed June 26, 1978 now U.S. Pat. No. 4,232,981. In such disclosure, a beaded liquid product is described in which a plurality of beads are mixed in a flowable liquid and the mixture is directed into an outer support or through a tubular conduit before an inner member is moved along the support. When the inner member moves along the support in contact with the beaded liquid, the beads in the liquid provide a planar work field between the support and the inner member to minimize the frictional effects and thereby allow the inner member to be pulled or pushed along the support with less effort.

A number of other advantages accrue from the use of such a beaded liquid. For instance, in addition to the lower pulling or pushing forces, less tension or compression is exerted on the inner member to enable it and its outer bearing surface to be much lighter, less durable, and with properties more suitable for the intended operating use rather than for meeting installation requirements. There is less wear and less tension and compression forces on the outer surface of the inner member so it can be moved over longer distances with a thinner cover without appreciable damage to it.

While the method as set forth in the foregoing application is satisfactory in many respects, it has been found that there may be situations in which beads are insufficiently distributed in the liquid to sufficiently reduce the frictional effects between the support and the inner member. For this reason, a need has arisen for improvements in the dispensing of beads in a liquid in a support of the type described so that there will be sufficient distribution of beads throughout the length of the support to provide for the necessary reduction in friction so that the foregoing advantages will be realized.

SUMMARY OF THE INVENTION

The present invention satisfies the aforesaid need by providing apparaus and a method of using a beaded liquid for reducing frictional effects between two members by causing beads to be dispensed into an outer support as an inner member moves along the length of the same. For purposes of simplifying the description of the invention, the term "outer conduit" or "conduit" will be used when referring to the above-mentioned support, yet "outer conduit" or "conduit" will include a pipe or an open trough or other member capable of containing a flowable mixture and of supporting an inner member to be moved longitudinally of the support.

The present invention provides that the outer conduit will initially have a liquid therein, the liquid either partially filling or completely filling the outer conduit. The liquid may or may not have beads initially in it before movement of the inner member through the outer conduit. Typically, there will be beads in the liquid; however, they may not, for one reason or another, be sufficiently distributed uniformly throughout the liquid in the conduit, but such a condition will be substantially remedied by the practice of the present invention. Also, the present invention will allow for a reduction in the amount of beads of the liquid initially in the outer conduit.

In one embodiment of the invention, the inner member has one or more tubes mounted thereon, either at the top or at the sides, and each tube is coupled to a source of beads or a mixture of beads and liquids so that beads or mixture, directed under pressure into and through the tube, can be dispensed therefrom as the inner member moves through the outer conduit. The tube will preferably extend forwardly from the front end of the inner member and be provided with holes therein or by other dispensing means so that the beads can be dispensed in advance of the inner member. The holes in the tube can be arranged so that the beads are dispensed in a number of different directions to provide for a uniformity in distribution. This is especially important if the outer conduit is completely filled with the liquid and if the beads of different specific gravities are to be located near the upper and lower inner surface portions of the outer conduit.

Another embodiment of the invention includes the use of containers outside of the outer conduit at spaced locations along the length thereof, the containers being coupled by passages to the inner conduits so that beads contained in the containers, either in a dry condition or mixed with a liquid, can be dispensed into the conduit as the inner member moves along the same. These containers can also be used in conjunction with the tube carried by the inner member so that the dispensing of beads can be from both the containers and the tube. The containers are especially suitable for use adjacent to inclined parts of the conduit where beads ordinarily have a tendency to gravitate toward the bottom of the inclined parts.

In another embodiment of the apparatus, beads can be sprayed onto the inner member as it enters the outer conduit and this case is especially suitable for use where the inner member is to be moved only over short distances. In such a case, the inner member can be hand or otherwise coated with a viscous liquid before it is placed in the outer conduit and beads can be sprayed onto the coated outer surface of the inner member as the latter enters the outer conduit. Beads can then be also dispensed into the outer conduit and onto the inner member from containers at spaced locations along the length of the outer conduit.

When the outer conduit is completely filled with the liquid, the outer conduit will preferably be provided with one or more vertical standpipes so that sufficient additional space will be provided to receive the liquid caused by the displacement or rise in the level of the liquid due to the movement of the inner member into and through the outer conduit. The standpipes will be in fluid communication with the outer conduit to allow immediate rise in liquid level to accomodate the inner member.

The primary object of this invention is to provide a methiod and apparatus for using a beaded liquid to minimize friction between an outer conduit and an inner member wherein beads are dispensed into a liquid in an outer conduit as an inner member moves along the same to provide for a substantially uniform distribution of the beads in the liquid in the outer conduit to minimize friction between the latter and the inner member rather than having to rely solely upon the distribution of the beads in the liquid originally in the outer conduit.

Another object of the present invention is to provide apparatus and a method of the type described wherein beads are deposited in the outer conduit in the liquid therein in advance of the inner member either by a tube carried by the inner member, by spaced containers along the length of the outer conduit, by both the tube and the containers, or by directing the beads through the inner member itself so that sufficent volume of beads will be in the outer conduit to provide for a bead distribution which will minimize or substantially eliminate the friction between the outer conduit and the inner member.

Other objects of this invention will become apparent as the following specification progresses, reference being had to the accompanying drawings for an illustration of several embodiments of the invention.

IN THE DRAWINGS

FIG. 1 is a vertical section through an outer conduit through which an inner member is moved, the inner member having means thereon for carrying and dispensing a mass of beads in advance of the inner member for deposit of the beads within the outer conduit to minimize friction between the outer conduit and the inner member;

FIG. 2 is a vertical section taken along line 2—2 of FIG. 1 and showing the may in which the dispensing means on the inner member can direct beads in a number of different directions for purposes of uniform distribution of the beads;

FIG. 3 is a view similar to FIG. 2 but showing the inner member buoyant in a liquid in the outer conduit with dispensing tubes for beads on opposite sides of the inner member;

FIG. 4 is a view similar to FIG. 1 but showing the way beads are deposited in the outer conduit at spaced locations along its length as the inner member moves through the outer conduit;

Figure 5:
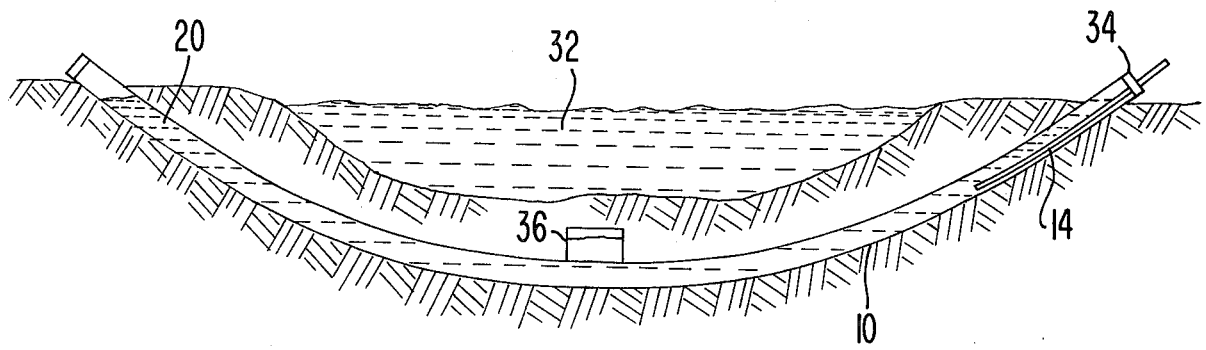
FIG. 5 is a schematic view of an outer conduit under a body of water, the conduit being filled with liquid and plugged at both ends thereof during the time when an inner member is fed therethrough, the outer conduit having a vertical standpipe for receiving excess liquid due to the presence of the inner member in the outer conduit.
Figure 6:
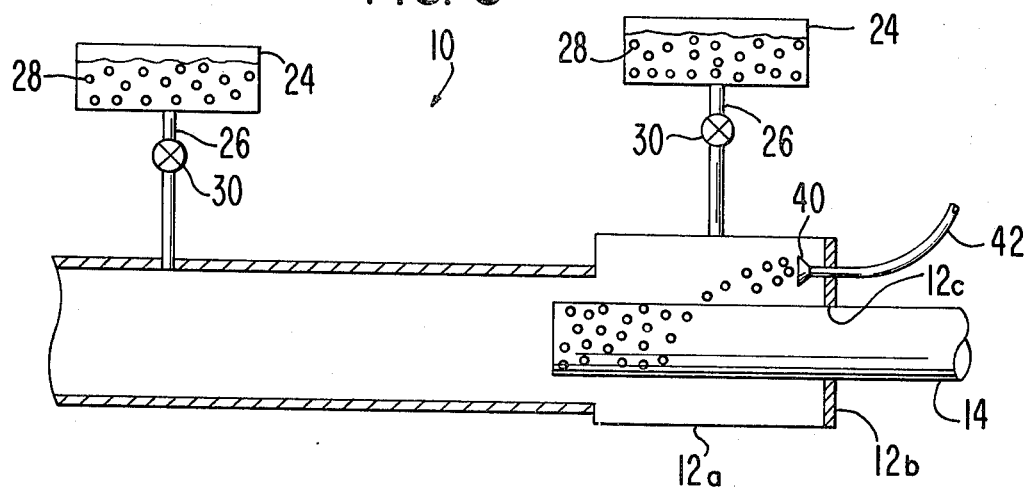
Figure 7:
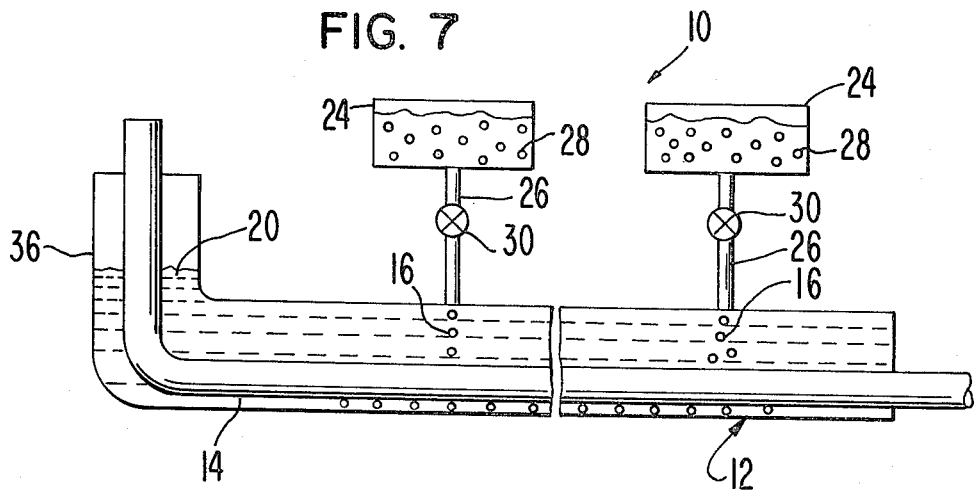

FIG. 6 is a view similar to FIG. 4 but showing an improved bead dispensing means at the entrance end of the outer conduit, with the inner member being shown inserted into the outer conduit; and FIG. 7 is a view similar to FIG. 5 but showing the exit end of the outer conduit provided with a vertical standpipe and with bead dispensing means at each of a number of spaced locations along the outer conduit.

The system of the present invention for permitting an inner member to be moved through an outer conduit is broadly denoted by the numeral 10 and is shown in FIGS. 1 and 2. System 10 includes an outer conduit 12 through which an inner member 14 is moved in the direction of arrow 15 (FIG. 1). The inner member can be a pipe or a cable and conduit 12 can be located below ground or on or below the bottom of a body of water. Thus, inner member 14 can be moved from one location to another over a long distance after conduit 12 has been laid in place. The purpose of the present invention as applied to the system of FIG. 1 is to provide for the delivery of individual beads 16 to the inner surface of outer conduit 12 as inner member 14 is moved therethrough. The beads are deposited in outer conduit 12 in advance of inner member 14 and in locations to minimize or substantially reduce the frictional effects between outer conduit 12 and inner member 14.

To achieve the foregoing, inner member 14, in one embodiment of the invention, is provided with a tube 18 mounted thereon either at the top or side thereof. Tube 18 will be connected to a source of beads 16 (not shown), such a source typically being at or near the entrance end of outer conduit 12. Beads 16 will be delivered through tube 18 in a liquid or in a dry condition, and the beads will be under sufficient pressure so that they will move forwardly through tube 18 and out the end or through a number of perforations at the forward end 18a thereof. The perforations will be located so that the beads will be at least directed generally downwardly, assuming that inner member 14 is adjacent to and moves along the bottom of outer conduit 12. Typically, there will be a liquid 20 in outer conduit 12 normally at least to a level above the bottom of conduit 12 such that the beads deposited therein provide a planar work field 22 of beads as shown in FIGS. 1 and 2. The word "planar" as used herein refers to a plane-like surface in a general sense and is applicable to both flat and cylindrical or curved surfaces for conduit 12. While conduit 12 is shown as being circular in cross-section, it can have other cross-sections as well. The forward end of inner member 14, may have a cap (not shown) thereon to prevent liquid from entering the inner member.

Liquid 20 will preferably be provided with beads 16 before the inner member is directed into outer conduit 12. Thus, beads 16 dispensed from tube 18 will supplement the beads already in the liquid, but will usually be necessary at times where the beads are depleted at certain locations in outer conduit 12 either under the influence of the movement of inner member 14 or by the presence of small grades over which outer conduit 12 extends. The number of perforations in end 18a, the distance by which end 18a projects forwardly from inner member 14, and the angles, along which the beads are directed, will be determined by the volume of beads 16 which are to be delivered from end 18a and this may well depend upon the irregularities in outer conduit 12.

Tube 18 is secured to inner member 14 in any suitable manner, such as by welding or by bands or straps. Moreover, tube 18 may have bead-dispensing perforations which extend about the tube so that the beads can be directed in a number of different directions as shown in FIG. 2. This arrangement of perforations may be deemed necessary to obtain a substantially uniform distribution of the beads in liquid 20 rather than have the beads be dispensed from end 18a straight downwardly as shown in FIG. 1. Also, there could be perforations along the tube to dispense beads and/or beads in liquid from the tube.

FIG. 3 shows the case where the outer conduit 12 is filled with liquid 20 and the liquid has a specific gravity greater than that of inner member 14. In this case, member 14 will be buoyant in the liquid and will pass through inner conduit 12 near the upper inner surface thereof. Moreover, FIG. 3 shows a pair of tubes 18 on opposite sides of member 14 for dispensing beads, either in a liquid or in a dry condition, so that the beads 16, having a specific gravity less than that of liquid 20, will rise and present a planar work field 22 along the upper inner surface of outer conduit 12. In addition, beads of different specific gravities can be used so that planar work fields 22 can be formed both along the upper inner surface of outer conduit 12 and along the lower inner surface as shown in FIG. 2. Thus, this feature will substantially compensate for bends and inclines in the outer conduit to minimize or substantially eliminate friction between outer conduit 12 and inner member 14 regardless of the irregularities along the length of outer conduit 12.

FIG. 4 shows the way in which beads are dispensed into outer conduit 12 at spaced locations along the same as inner member 14 moves in the direction of arrow 15. To this end, a number of containers 24 can be provided at spaced locations above conduit 12 and connected thereto by tubes 26 which place the containers in fluid communication with the interior of outer conduit 12. Each container 24 will be provided with a mass 28 of beads 16, either in a dry form or mixed in a liquid, and the beads will fall by gravity or under a slight pressure into outer conduit 12 to increase the volume of beads therein, assuming that liquid 20 in the outer conduit will have initially been provided with beads. The beads can also be metered as they enter conduit 12.

Beads from containers 24 can be deposited in outer conduit 12 when the latter is either full or partially full of liquid 20. As shown in FIG. 4, outer conduit is full of liquid. Moreover, the beads 16 deposited from containers 24 can have specific gravities such that they either gravitate to the bottom of the outer conduit, remain near the upper inner surface of the conduit, or are maintained both at the upper and lower inner surfaces of the conduit. Furthermore, containers 24 can be provided to supply beads even though beads are dispensed from a tube 18 of the type described above with respect to FIGS. 1-3. For metering beads from each container 24, suitable structure can be provided to dispense a volume of beads at a controlled rate as required from the container. For purposes of illustration, a valve 30 is provided in each tube 26 for metering purposes. Other metering devices can be used for this purpose, if desired.

FIG. 4 also illustrates that a container 24 can be mounted on an inclined part of outer conduit 12. While the beads may gravitate to the bottom of the inclined part, the dispensing of beads from container 24 can be timed so that the beads are dispensed only during the time in which inner member 14 moves along the inclined part. This can be controlled by suitable sensing structure (not shown) which senses the location of the front end or other parts of inner member 14 at all times while inner member 14 is moving in conduit 12.

FIG. 5 shows a schematic view of system 10 as it extends between two shore locations and beneath a body of water 32. Conduit 12 is also shown as being plugged at both ends thereof and filled with liquid 20 which may contain beads. The plug at the entrance end of conduit 12, denoted by the numeral 34, provides a stuffing box through which inner member 14 is advanced. Member 14 can be provided with one or more tubes 18 as described above and conduit 12 can be provided with containers 24 at various locations along its length. When outer conduit 12 is filled with liquid 20, an additional space is required to compensate for the rise in the level of liquid 20 caused by the movement of inner member 14 into and through conduit 12. To this end, one or more vertical standpipes 36 are connected in fluid communication with and extend upwardly from outer conduit 12. Thus, as the inner member continues to move through outer conduit 12, liquid will rise in each standpipe 36, yet beads will remain dispersed in the liquid to minimize or substantially eliminate the friction between outer conduit 12 and inner member 14. FIG. 7 shows a vertical standpipe 36 at the exit end of outer conduit 12 with a number of containers 24 at spaced locations along the length of the outer conduit for directing beads or beaded liquid into the outer conduit for the reasons advanced above with respect to FIG. 4.

FIG. 6 illustrates the entrance end of conduit 12 including a housing 12a having an end wall 12b provided with a stuffing box or opening 12c through which inner member 14 passes as it moves into outer conduit 12. Conduit 14 may be provided with one or more tubes for dispensing beads, such as tube 18 as described above, and conduit 12 may have one or more containers 24 connected by tubes 26 and valves 30 to conduit 12 to dispense a mass 28 of beads 16 or beaded liquid into the conduit as described above with respect to FIG. 4.

Housing 12a can also have a container 24 and can also be provided with a spray head 40 near wall 12b, the spray head being connected by a delivery tube 42 connected to a source (not shown) of beads or beaded liquid under pressure. The beads can be sprayed into the entrance end of conduit 12 to minimize friction between outer conduit 12 and inner member 14 in housing 12a. Typically, the spray head is used when the distance over which inner member 14 is to be moved is relatively short. Also, the spray head is used when member 14 has a liquid which is hand-coated on or otherwise applied to its outer surface as the member is inserted into housing 12a. The coating of the liquid will be done with a liquid which is viscous and remains on the outer surface of inner member 14 by adhesion or surface tension.

We claim:

1. In combination: an outer conduit having an entrance end and containing a liquid therein; an inner member having a front end and movable through the liquid in the outer conduit; and a tube carried by said inner member and extending along the inner member, the tube having a forward portion near the front end of the inner member, said tube adapted to be coupled with a source of beads near the entrance end of the outer conduit, the tube having an opening near the front end of the inner member to permit the beads to be dispensed from the tube and into the liquid.

2. The combination as set forth in claim 1, wherein the tube has a number of perforations therethrough on the forward portion thereof for dispensing beads into the liquid.

3. The combination as set forth in claim 1, wherein there is provided a second tube having an opening for dispensing beads and adapted to be coupled with said source of beads, the tubes being mounted on the inner member at opposed sides thereof.

4. A method of moving an inner member along an outer conduit having an entrance end and capable of containing a liquid comprising: providing a liquid in the outer conduit; moving the inner member along the outer conduit and through the liquid; moving a quantity of beads from a source near the entrance end of the outer conduit along a path extending longitudinally of the inner member; and dispensing beads into the liquid near the front end of the inner member as the inner member moves along the outer conduit.

* * * * *